United States Patent
Makani

(10) Patent No.: US 12,211,303 B2
(45) Date of Patent: Jan. 28, 2025

(54) DATA CLASSIFICATION BASED ON RECURSIVE CLUSTERING

(71) Applicant: PAYPAL, INC., San Jose, CA (US)

(72) Inventor: Gautam Makani, Orinda, CA (US)

(73) Assignee: PAYPAL, INC., San Jose, CA (US)

( * ) Notice: Subject to any disclaimer, the term of this patent is extended or adjusted under 35 U.S.C. 154(b) by 608 days.

(21) Appl. No.: 17/360,841

(22) Filed: Jun. 28, 2021

(65) Prior Publication Data

US 2022/0414369 A1 Dec. 29, 2022

(51) Int. Cl.
*G06V 30/40* (2022.01)
*G06F 16/906* (2019.01)
*G06F 16/93* (2019.01)
*G06F 18/23* (2023.01)
*G06F 18/2431* (2023.01)
*G06N 3/08* (2023.01)

(52) U.S. Cl.
CPC ............ *G06V 30/40* (2022.01); *G06F 16/906* (2019.01); *G06F 16/93* (2019.01); *G06F 18/23* (2023.01); *G06F 18/2431* (2023.01); *G06N 3/08* (2013.01)

(58) Field of Classification Search
CPC ............ G06V 30/40; G06V 30/19107; G06V 30/19147; G06V 30/418; G06F 16/906; G06F 16/93; G06F 18/23; G06F 18/2431; G06N 3/08; G06N 3/088; G06N 3/09
See application file for complete search history.

(56) References Cited

U.S. PATENT DOCUMENTS

| | | | | |
|---|---|---|---|---|
| 6,078,913 A * | 6/2000 | Aoki | | G06F 16/951 |
| 9,576,210 B1 * | 2/2017 | Liu | | G06T 7/0002 |
| 10,726,032 B2 * | 7/2020 | Visbal | | G06F 40/186 |
| 11,126,647 B2 * | 9/2021 | Rollings | | G06F 16/355 |
| 11,392,697 B2 * | 7/2022 | Gauthier | | G06N 5/04 |
| 11,720,600 B1 * | 8/2023 | Dixit | | G06F 16/906 |
| | | | | 707/738 |
| 11,741,168 B1 * | 8/2023 | Bodapati | | G06F 16/35 |
| | | | | 706/12 |
| 2019/0220660 A1 * | 7/2019 | Cali | | G06V 30/40 |

(Continued)

OTHER PUBLICATIONS

Hao, Pei-Yi, Jung-Hsien Chiang, and Yi-Kun Tu. "Hierarchically SVM classification based on support vector clustering method and its application to document categorization." Expert Systems with applications 33.3 (2007): 627-635. (Year: 2007).*

*Primary Examiner* — Emily C Terrell
*Assistant Examiner* — Stefano Anthony Dardano
(74) *Attorney, Agent, or Firm* — Haynes and Boone, LLP

(57) ABSTRACT

Methods and systems are presented for providing a machine learning model framework configured to perform complex data classifications. Upon receiving a request for classifying data, the data is recursively assigned to one or more clusters. During each iteration of clustering assignment, a set of clusters is selected based on a previously assigned cluster for the data, and the data is then assigned to a particular cluster from the selected set of clusters. The machine learning model framework also includes a plurality of machine learning models configured to perform simple data classifications. A particular machine learning model is selected from the plurality of machine learning model based on the one or more clusters to which the document is assigned. The particular machine learning model is then used to classify the document.

20 Claims, 7 Drawing Sheets

(56) References Cited

U.S. PATENT DOCUMENTS

| | | | |
|---|---|---|---|
| 2021/0097337 A1* | 4/2021 | Wang | G06V 10/774 |
| 2022/0222416 A1* | 7/2022 | Conger | G06F 40/106 |
| 2023/0237769 A1* | 7/2023 | Li | G06V 10/763 |
| | | | 382/159 |

* cited by examiner

DATA CLASSIFICATION BASED ON RECURSIVE CLUSTERING

BACKGROUND

The present specification generally relates to machine learning, and more specifically, to providing a machine learning model framework configured to perform complex data classifications according to various embodiments of the disclosure.

RELATED ART

Machine learning models are often used to perform data classifications. For example, machine learning models may be used in classifying an electronic transaction (e.g., whether the transaction is a legitimate transaction or a fraudulent transaction, etc.). After being trained using training data that is labeled with different categories (classifications), a trained machine learning model can typically perform simple data classifications with high accuracy performance (e.g., above 80%, above 90%, etc.). Simple data classifications are classifications that involve less than a threshold number of categories (e.g., 10, 20, 50, etc.). In other words, in performing simple data classifications, machine learning models are required to classify data into a number of categories less than the threshold number. By contrast, complex data classifications are classifications that involve a number of categories exceeding the threshold number. That is, a machine learning model is required to classify data into a number of categories exceeding the threshold number. Furthermore, in complex data classifications, the number of categories may be in flux (e.g., the number of categories may be expanding due to new additional categories that may be discovered in the future, etc.).

Machine learning models have traditionally failed to perform complex data classifications with acceptable accuracy performances (e.g., above a threshold accuracy such as 70%, 80%, etc.), even with a sufficiently large amount of training data. The low accuracy in performing complex data classification is partly due to the inability for a machine learning model to process the large number of categories and/or to discern the differences (which may be small differences) between data of different categories. Thus, there is a need for improving the accuracy performance of machine learning models in performing complex data classifications.

Figure 1:
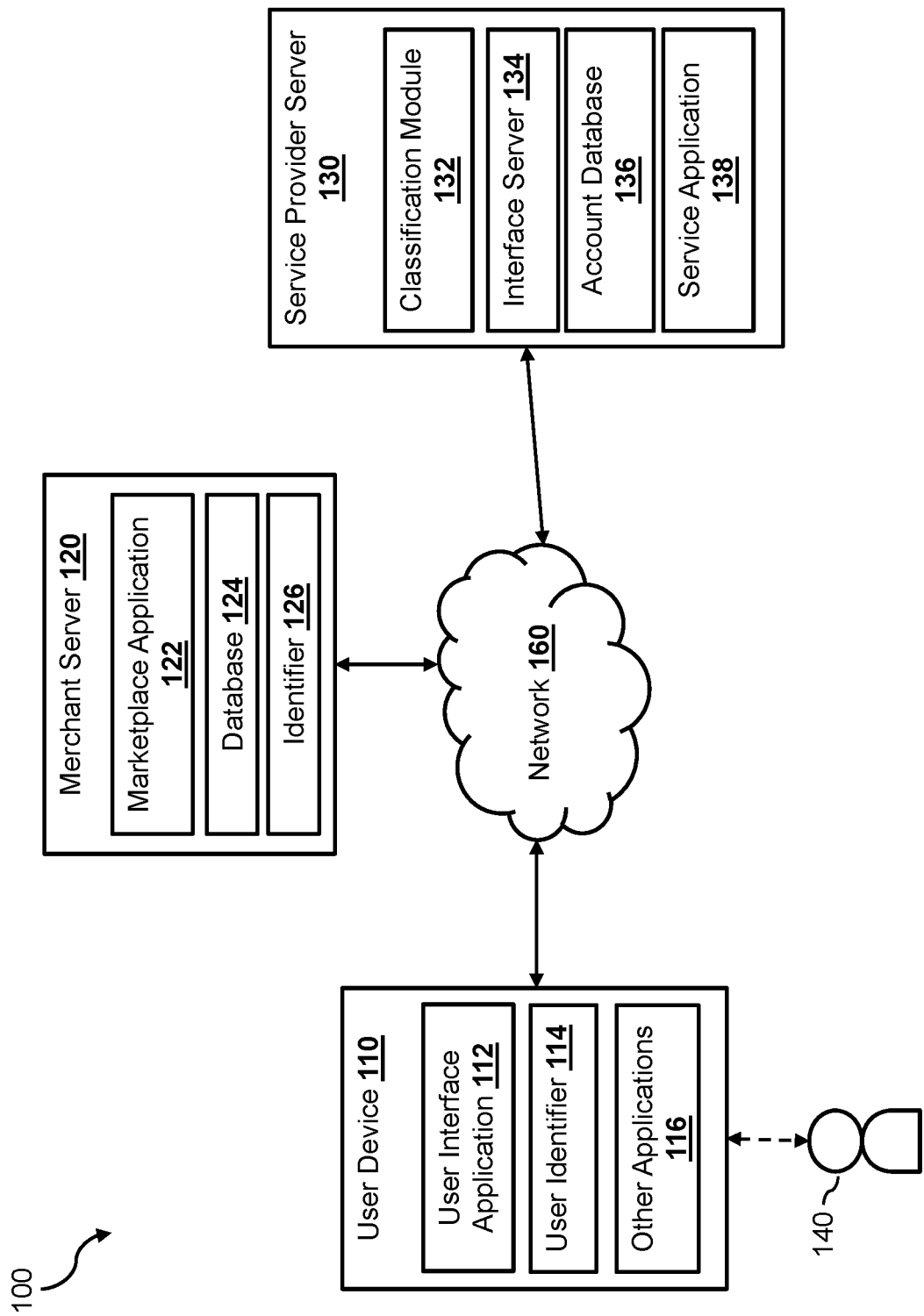
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a machine learning model framework configured to perform complex data classifications. For example, the machine learning model framework may be used by a server associated with an online service provider to classify documents. In this example, the server may be configured to perform various transactions for its users. To process and/or facilitate those different types of transactions, the server may receive various types of documents from users of the online service provider. The server may use a machine learning model to classify the documents such that the server may determine whether the documents submitted by the users are of the correct document types. The server may also use the classification of the documents to extract various data from the documents. However, due to the various transactions that the server can process and the geographical areas to which the server can provide the services, the number of different document types that the server receives may be large. For example, the documents that the server receives from the users may include driver licenses from different states and/or countries, passports or other identification documents from different countries, merchant agreements, sales receipts, and other types of documents. Thus, the number of categories (e.g., document types) that the machine learning model is required to classify the documents into may exceed a particular threshold (e.g., 100, 500, 800, 1000, etc.). To exacerbate the problem, the document that is received by the server may not be of any one of the known categories. For example, a new type of identification document may be introduced (e.g., by a government agency). Thus, not only is the machine learning model required to classify documents into a large number of categories, the machine learning model may also need to detect that a document is of an unknown category when the document cannot be classified into any one of the known categories.

As discussed above, it has been conventionally a challenge for machine learning models to perform complex data classifications (when the machine learning models are required to classify data into a large number of categories, such as 100, 500, 1000, etc.) with an acceptable accuracy (e.g., exceeds 80%, 90%, etc.). It is partly due to the inability for a single machine learning model to process the large number of categories and/or to discern the differences (which may be small differences) between data of different categories.

Thus, according to various embodiments of the disclosure, a classification system may provide a machine learning model framework for performing complex data classification. The machine learning model framework may include a recursive structure, multiple clustering models, and multiple machine learning models. In some embodiments, the recursive structure may be used by the classification system to determine which of the multiple machine learning models should be used to classify a document. For example, the recursive structure may include a tree structure. The tree structure may include a root node, other non-leaf nodes in one or more levels of the tree structure, and leaf nodes. Different clustering models may be associated with different non-leaf nodes in the recursive structure. The classification system may traverse the recursive structure from the root node based on assigning the document to one or more clusters using the clustering models associated with the non-leaf node. The classification system may reach a leaf-node based on the traversing the recursive structure. In some embodiments, a different machine learning model is associated with each leaf node of the recursive structure. Each of the multiple machine learning models of the machine learning model framework is configured and trained to perform simple data classifications (classifying documents into a number of document types less than the threshold). Based on the leaf node that the classification system reaches from traversing the recursive structure using the document, the classification system may use the machine learning model associated with the leaf node to classify the document.

For example, the server of the online service provider may receive an image of a document from a user (e.g., via a user interface of the online service provider). The classification system may extract features, such as the text features, the image features, and the enriched features, etc., from the image, using the techniques disclosed herein. Upon accessing the images of the documents, the classification system may perform a set of pre-processing operations on the images, such as image resizing, orientation correction, sharpening, denoising, thresholding, etc. The classification system may then extract text features from the images using techniques such as optimal character recognitions. The text features may represent the text included within a document, an arrangement of alpha-numeric values in the text, a frequency of each alphabet/numeral in the text, locations of the different text within the document, and other textual characteristics associated with the document.

In some embodiments, the classification system may also extract image features from the images of documents. The image features may represent non-text information in an image, such as lines, borders, boundaries, logos or other shapes that appear within the image, and other non-textual characteristics of the image. In some embodiments, the classification system may also determine enriched features for each image of documents. The enriched features may include metadata of the image, such as a file name, a file type (e.g., a PDF document image, a JPEG image, etc.), a document name, a file size, a number of pages, length of the text, a language of the text, etc.

The classification system may then traverse the recursive structure, starting at the root node, based on the document. For example, at the root node, the classification system assigns the document using a clustering assignment process (e.g., using the clustering model associated with the root node), based on the features of the document, to one of the multiple clusters that were generated by the clustering model (e.g., how close is the document to the centroid of each of the clusters, etc.). Based on the assigned cluster, the classification system may select one of the multiple paths within the recursive structure to reach a node in the second level of the recursive structure. If the node is a non-leaf node, the classification system may, again, assign the document to another cluster generated by the clustering model associated with the non-leaf node, and continue to traverse the recursive structure based on the assigned cluster, until the document reaches a leaf node of the recursive structure.

When the document reaches the leaf node of the recursive structure, the classification system may use the trained machine learning model associated with the leaf node to perform a classification for the document based on the features of the document. The machine learning model may output a category (e.g., a document type) based on the features of the document. Once the document is classified as a particular document type, the classification system may perform one or more actions based on the document type of the document. For example, the classification system may determine whether the document type corresponds to a requested document type. If the document type does not correspond to the requested document type, the classification system may present an error message on a user interface and to prompt a user to resubmit a document that corresponds to the requested document type.

If the document type corresponds to the requested document type, the classification system may accept the document and store the document in a data storage in association with a user account of the user. In some embodiments, based on the document type that is determined by the machine learning model framework, the classification system may extract data from the document. For example, if the document is determined to be a driver's license, the classification system may extract data (e.g., a name, an address, a driver's license number, a date of birth, etc.) from the document based on a format associated with the document type.

FIG. 1 illustrates an electronic transaction system 100, within which the classification system may be implemented according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via websites hosted by, or mobile applications associated with, the merchant server 120 respectively. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the merchant server 120 and/or the service provider server 130, and may transmit data files, such as an image, a document, etc. to the merchant server 120 and/or the service provider server 130.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110. For example, the user 140 may use the input component to interact with the UI application 112 (e.g., to add a new funding account, to perform an electronic purchase with a merchant associated with the merchant server 120, to provide information associated with the new funding account, to initiate an electronic payment transaction with the service provider server 130, etc.).

While only one user device 110 is shown in FIG. 1, it has been contemplated that multiple user devices, each associated with a different user, may be connected to the merchant server 120 and the service provider server 130 via the network 160.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140 or a merchant associated with the merchant server 120, etc.) may access a user account associated with the user and access various services offered by the service provider server 130, by generating HTTP requests directed at the service provider server 130. In some embodiments, in order to process certain types of transactions for a user (e.g., the user 140, a merchant associated with the merchant server 120, etc.), the service provider server 130 may request the user 140 to submit one or more documents (e.g., a driver's license, a merchant agreement, etc.) via an interface presented on a device (e.g., the user device 110, the merchant server 120, etc.). The user may then transmit one or more images of the documents to the service provider server 130 (e.g., uploading images of documents to the service provider server via a user interface provided on the user device 110).

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a classification module 132 that implements the classification system as discussed herein. The classification module 132 may be configured to classify data for the service provider server. In a non-limiting example, the classification module 132 may be configured to classify documents received from users of the service provider server (e.g., user 140, users of user devices 180 and 190, a merchant of the merchant server 120, etc.) into one of multiple document types. In some embodiments, the documents received from the users may correspond to a vast number of document types, such as driver's licenses associated with different states and/or countries, passports or other identification documents from different countries, merchant agreements, sales receipts, and other types of documents. Thus, the number of document types may exceed a threshold, such as 100, 200, 500 different document types, rendering the data classifications required of the classification module 132 a complex data classification.

The capability of accurately classifying documents received from users has many benefits. For example, when the document is received from a user in response to a document request in association with processing a transaction for the user, accurately determining whether the document received is the correct document type in real-time enables the user to correct the mistake (e.g., by resubmitting a correct document) before the service provider server 130 begin processing the transaction using an incorrect document. In another example, after determining the document type of a document, the service provider server 130 may use various techniques to extract data from the document based on the document type and store the extracted data in a record for the user.

As discussed herein, it has been a challenge to provide a single machine learning model to perform complex data classifications with acceptable accuracy performance. As such, the classification module 132 may use a machine learning model framework as disclosed herein to perform the complex data classifications. The machine learning model framework may include a recursive structure having nodes in multiple levels. Each node in the recursive structure may be associated with a clustering model or a machine learning model. The machine learning model framework may use the clustering models to divide the classification tasks of different document types into different cluster groups, such that each of the machine learning models may be required to perform a simple data classification, instead of a complex data classification.

Figure 2:
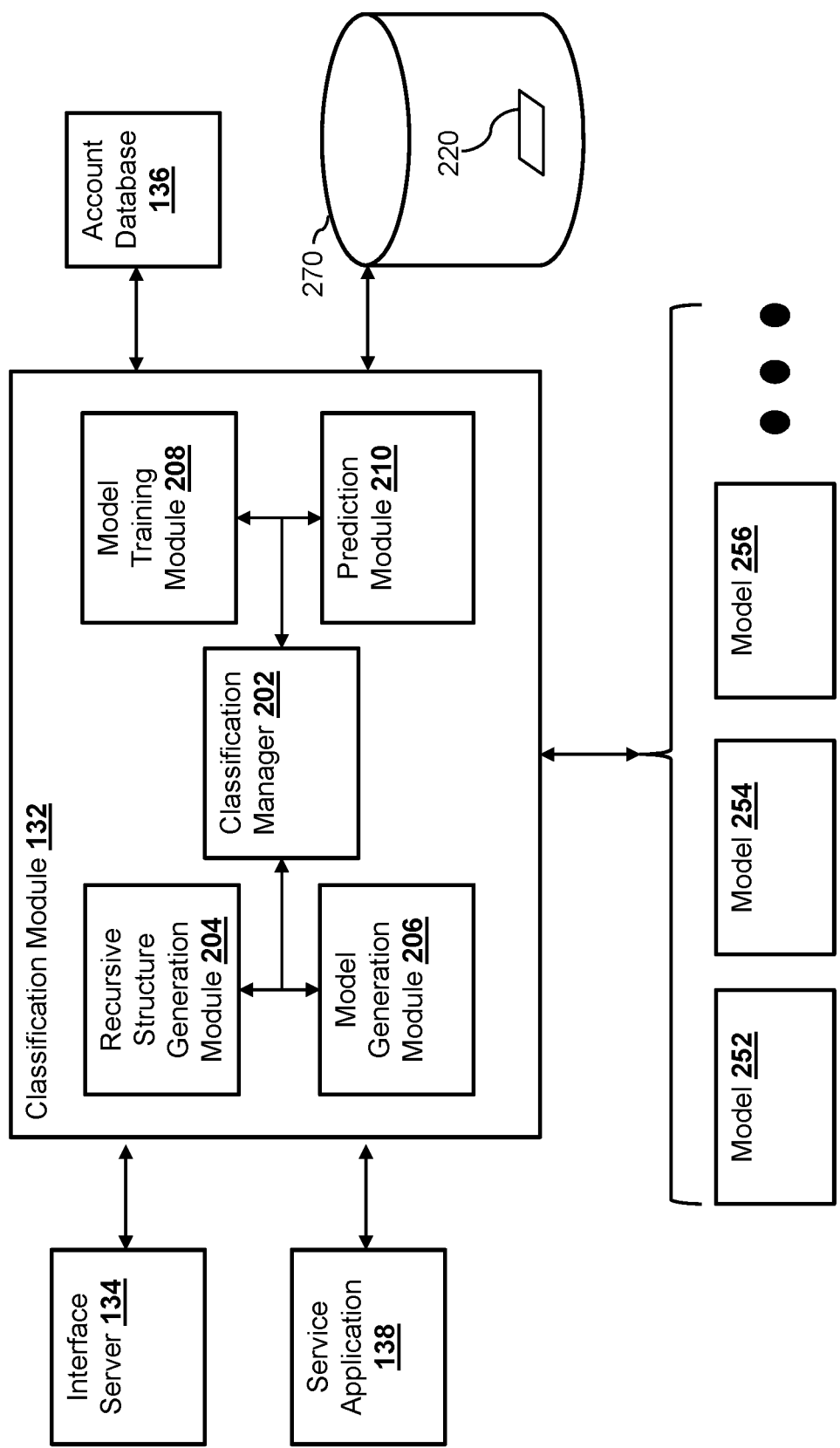
FIG. 2 is a block diagram illustrating a classification module according to an embodiment of the present disclosure.

FIG. 2 illustrates a block diagram of the classification module 132 according to an embodiment of the disclosure. The classification module 132 includes a classification manager 202, a recursive structure generation module 204, a model generation module 206, a model training module 208, and a prediction module 210. As discussed herein, the interface server 134 may provide a user interface on a device of a user (e.g., the user device 110, the merchant server 120, etc.). The user may transmit a transaction request to the online service provider 130 via the user interface. The service application 138 may be configured to process the transaction request. In some embodiments, in order for the service application 138 to process certain types of transaction, the service application 138 may request one or more documents from the user via the user device. For example, the service application 138 may prompt, via the user interface, the user for documents such as a driver's license, an identification document such as a passport, a certain type of agreements such as a merchant or vendor agreement, a sales agreement, etc. The user may then transmit an image of a document (e.g., a JPEG file, a PDF file, etc.) to the online service provider 130 via the user interface (e.g., uploading the image of the document, etc.).

It may be desirable for the online service provider 130 to determine whether the document received from the user is of the right document type, such that remediation actions can be performed as quickly as possible to ensure that the transaction request can be processed timely. As such, the online service provider 130 may use the classification module 132 to determine a document type of the document based on the image of the document received from the user. As shown, in some embodiments, the classification module 132 may be in communication with the interface server 134 and the service application 138, such that when the interface server 134 and/or the service application 138 may request the classification module 132 to classify a document based on the document image received from the user.

In some embodiments, since the number of document types may be large (e.g., exceeding a threshold such as 100, 200, etc.), the classification manager 202 may provide a machine learning model framework that is configured to perform complex data classifications for classifying the documents. The classification manager 202 may use the recursive structure generation module 204 to generate a recursive structure of the machine learning model framework based on a set of training data (e.g., a set of documents 220) stored in a data storage 270. The set of training data may include a set of images of documents, and the documents may correspond to different document types that may be received by the online service provider 130. The training data may include images of documents that have previously been categorized (e.g., labeled) with a document type. As discussed herein, the documents that the server receives may correspond to a large number of different document types (e.g., 100, 500, 1000, etc.).

To generate the recursive structure, the recursive structure generation module 204 may first create a root node (e.g., a first level of the recursive structure) and a clustering model (that can be configured to perform a clustering assignment process) (e.g., K-means clustering models, hierarchical clustering models, etc.) associated with the root node. The clustering model may be configured to divide a group of documents into two or more clusters of documents based on the features of the documents (e.g., the text features, the image features, the enriched features, etc.). As such, the clustering model may assign documents that are similar to each other (having similar features) in the same cluster and assign documents that are dissimilar to each other (having different features) in different clusters. However, since the group of documents are divided into clusters that are less than the number of categories associated with an initial set of documents (the entire training data), each cluster may include documents of one or more categories. Furthermore, since the clustering model may perform the clustering without any knowledge of the categories (e.g., document types) associated with the documents (unsupervised learning), some of the documents that belong to the same categories may still be divided into different clusters.

In some embodiments, the classification system may configure the clustering model to divide the initial set of documents (e.g., the entire training data) into two or more clusters. Since the clustering model is associated with the root node, the clustering model may be configured by the classification system to cluster all of the training documents based on the features (e.g., the text features, the image features, and the enriched features) of the documents.

In some embodiments, the recursive structure generation module 204 may determine a specific number of clusters for the clustering model associated with the root node. For example, the recursive structure generation module 204 may use a Silhouette analysis or an Elbow technique to determine the specific number of clusters (e.g., an optimal number of clusters), and may configure the clustering model to divide the documents into the specific number of clusters. Based on the number of clusters that the clustering model divides the documents into, the recursive structure generation module 204 may generate a corresponding number of nodes in the next level of the recursive structure (a second level or the level below the root node). For example, if the recursive structure generation module 204 configures the clustering model to divide the documents into three clusters, the recursive structure generation module 204 may generate three nodes for the next level (e.g., the second level) in the recursive structure. The recursive structure generation module 204 may connect the root node to the three new nodes in the second level of the recursive structure. After dividing the documents into three clusters of documents (three groups of documents) using the clustering model, the recursive structure generation module 204 may also associate each cluster of documents with a corresponding node in the second level of the recursive structure.

For each node in the second level of the recursive structure, the recursive structure generation module 204 may again configure a clustering model (similar to the clustering model associated with the root node) to further divide the group of documents associated with the node into different clusters. Since each group of documents assigned to each node in the second level of the recursive structure includes different documents, the characteristics of the documents within different groups may be different. As such, the recursive structure generation module 204 may configure the clustering models associated with different nodes differently. For example, the recursive structure generation module 204 may configure the clustering models associated with the nodes in the second level to divide a corresponding group of documents into different numbers of clusters. In one example, the recursive structure generation module 204 may configure a first clustering model associated with a first node in the second level of the recursive structure to divide the documents into three clusters while configure a second clustering model associated with a second node in the second level of the recursive structure to divide the documents into only two clusters.

The recursive structure generation module 204 may use the clustering models to divide each corresponding group of documents into different clusters of documents and may create additional nodes in the subsequent layer (e.g., the third layer) of the recursive structure. The recursive structure generation module 204 may recursively generate additional layers of nodes in the recursive structure and configure a clustering model for each of the newly generated nodes until the recursive structure generation module 204 determines that the group of documents associated with a node cannot be further divided. When the recursive structure generation module 204 determines that a group of documents associated with a node cannot be further divided, the node becomes a leaf node of the recursive structure.

After the recursive structure is generated, the model generation module 206 may generate a machine learning model for each of the leaf nodes. Each machine learning model may be configured to perform a simple data classification. As discussed herein, the group of documents associated with each leaf-node may not be further divided by a clustering model. However, the group of documents may still include documents of multiple document types (but substantially less than the number of document types in the initial training set of documents due to the various clustering), among which the clustering model has failed to differentiate. Thus, the model training module 208 may configure and train a machine learning model to perform data classification based on the group of documents associated with a corresponding leaf node. For example, the model training module 208 may determine the different categories (e.g., the different document types) associated with the documents in the group of documents associated with the leaf node. The model training module 208 may then configure the machine learning model, for the leaf node, to perform data classification based on the determined different categories. Since the number of categories associated with the group of documents in the leaf node is substantially less than the total number of categories associated with the initial training set of documents, each of the machine learning models associated with the leaf nodes may be configured to classify documents into a number of categories that is much smaller than the total number of categories associated with the initial training set of documents.

In some embodiments, the model training module 208 may also train the machine learning model using the group of documents such that the machine learning model may classify incoming documents as one of the different categories. In some embodiments, instead of using the group of documents associated with the leaf node, the model training module 208 may use the group of documents associated with a connected node in a previous level of the recursive structure (e.g., a parent node, a grandparent node, etc.) for training the machine learning model. Since, the group of documents associated with each leaf node may correspond to only a small number of categories as discussed herein, the machine learning model may be trained to perform the simple data classification with acceptable accuracy performance (e.g., above a threshold such as 70%, 80%, etc.). After each of the machine learning models associated with the leaf nodes is configured and trained, the prediction module 210 may begin classifying unclassified documents.

Figure 3:
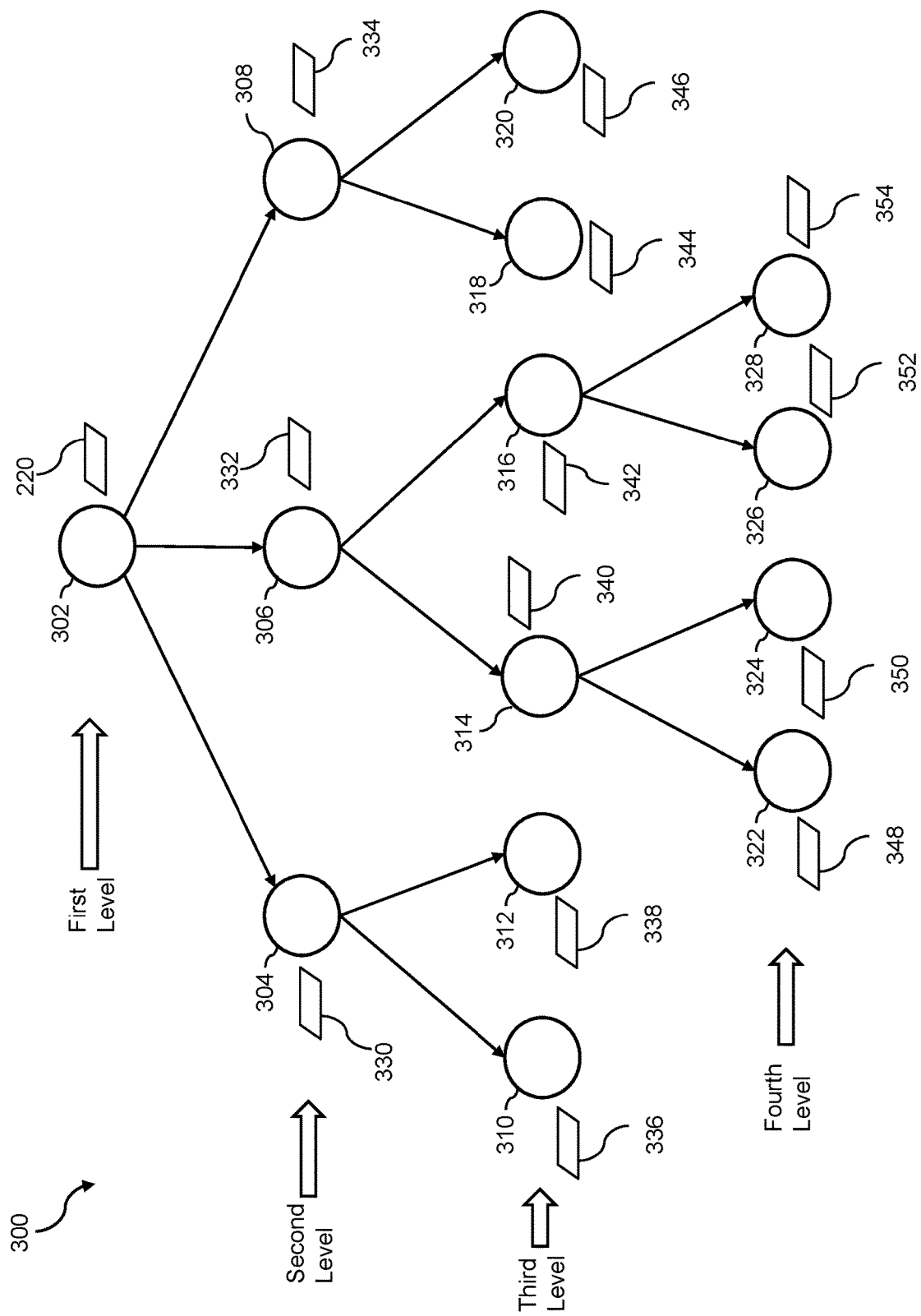
FIG. 3 illustrates an example recursive structure for classifying data according to an embodiment of the present disclosure.

FIG. 3 illustrates an example recursive structure 300 generated by the recursive structure generation module 204. As shown, the recursive structure 300 has a root node 302, non-leaf nodes 304-308 and 314-320 in multiple levels of the recursive structure 300, and leaf nodes 310, 312, and 322-328. To generate the recursive structure 300, the recursive structure generation module 204 may first create the root node 302. The recursive structure generation module 204 may also associate the initial set of documents 220 (e.g., the set of images of documents that correspond to the full sets of document types) with the root node 302. Furthermore, since the root node 302 is a non-leaf node, the classification manager 202 may use the model generation module 206 to generate a clustering model (e.g., K-means clustering models, hierarchical clustering models, etc.) for the root node 302. The clustering model may be configured to divide the set of documents 220 into multiple clusters of documents.

In some embodiments, the clustering model may be configured to divide the set of documents 220 based on features associated with the documents. As such, in some embodiments, the classification manager 202 may use the model training module 208 to extract features from each of the set of documents 220. As discussed herein the set of documents 220 may include images of the documents. Thus, in some embodiments, the model training module 208 may perform a set of pre-processing operations on the images, such as image resizing, orientation correction, sharpening, denoising, thresholding, etc. After the images are pre-processed, the model training module 208 may extract various features from the images. For example, the model training module 208 may extract text features from the images using techniques such as optimal character recognitions. The text features may represent the text included within a document, an arrangement of alpha-numeric values in the text, a frequency of each alphabet/numeral in the text, locations of the different text within the document, and other textual characteristics associated with the document.

In some embodiments, the model training module 208 may also extract image features from the images of documents. The image features may represent non-text information in an image, such as lines, borders, boundaries, logos or other shapes that appear within the image, and other non-textual characteristics of the image. In some embodiments, the model training module 208 may also determine enriched features for each image of documents. The enriched features may include metadata of the image, such as a file name, a file type (e.g., a PDF document image, a JPEG image, etc.), a document name, a file size, a number of pages, length of the text, a language of the text, etc.

The model generation module 206 may configure the clustering model to divide the set of documents 220 based on the features (e.g., the text features, the image features, the enriched features, etc.) extracted from the images. In some embodiments, the clustering model may determine, for each document, a vector or a point within a multi-dimensional space based on the features of the document. As discussed herein, the features extracted from each document may include a number of text features, and number of image features, and a number of enriched features. Each dimension within the multi-dimensional space may correspond to a feature type (e.g., a text feature type, an image feature type, enriched feature type, etc.). Based on the features extracted from a document, the model training module 208 may determine a value for each feature type. The model training module 206 may then determine a point (having a set of coordinates corresponding to the determined values for the feature types) within the multi-dimensional space for the document.

The clustering model may generate multiple clusters of documents based on the vectors or points associated with the documents within the multi-dimensional space, such that vectors or points that are close to each other will form a distinct cluster. This way, the clustering model may assign documents that are similar to each other (having similar features) in the same cluster and assign documents that are dissimilar to each other (having different features) in different clusters. The clustering model may also generate a centroid for each cluster, the centroid representing a center (e.g., a point based on average features from documents within the cluster) of the cluster.

In some embodiments, the model training module 208 may configure the clustering model to divide the initial set of documents 220 (e.g., the entire training data) into two or more clusters. The model training module 208 may determine a specific number of clusters for the clustering model associated with the root node 302. For example, the model training module 208 may use a Silhouette analysis or an Elbow technique to determine the specific number of clusters (e.g., an optimal number of clusters) based on the initial set of documents 220 and may configure the clustering model to divide the documents into the specific number of clusters.

Based on the number of clusters that the clustering model divides the documents into, the recursive structure generation module 204 may generate a corresponding number of nodes in the next level of the recursive structure 300 (a second level or the level below the root node 302). In this example, the model training module 208 may determine to divide the set of documents 220 into three clusters of documents. As such, the recursive structure generation module 204 may generate three nodes 304, 306, and 308 at the second level (a level below the root node 302) of the recursive structure 300. The recursive structure generation module 204 may connect the root node 302 to each of the nodes 304, 306, and 308 in the second level.

The model training module 208 may use the clustering model to divide the set of documents 220 into three clusters (e.g., three groups of documents 330, 332, and 334), each cluster corresponding to a different node in the second level. For example, the model training module 208 may correspond the group of documents 330 to the node 304, may correspond the group of documents 332 to the node 306, and may correspond the group of documents 334 to the node 308. Furthermore, the model generation module 204 may generate a clustering model for each of the nodes 304-308 in the second level of the recursive structure 300.

Similar to the clustering model associated with the root node 302, the model training module 208 may configure the clustering models for the nodes 304-308 based on the corresponding groups of documents 330-334. For example, the model training module 208 may determine a number of clusters based on the group of documents 330 using the techniques disclosed herein. Since each group of documents is different from each other, and different from the initial set of documents 220, the number of clusters determined for each of the clustering model may be different as well. In this example, the model training module 208 may determine two clusters for the clustering model associated with the node 304 based on the group of documents 330. The model training module 208 may also determine a number of clusters (which may be different numbers of cluster than the clustering model associated with the node 304) for the clustering model associated with each of the other two nodes 306 and 308 based on the corresponding groups of documents 332 and 334. The model training module 208 may then use the clustering models associated with the nodes 304-308 to divide the corresponding groups of documents 330-334 into different clusters (e.g., different groups of documents).

For example, the model training module 208 may use the clustering model associated with the node 304 to divide the group of documents 330 into two groups of documents 336 and 338. Similarly, the model training module 208 may use the clustering model associated with the node 306 to divide the group of documents 332 into two groups of documents 340 and 342. The model training module 208 may use the clustering model associated with the node 308 to divide the group of documents 334 into two groups of documents 344 and 346.

The recursive structure generation module 204 may then create additional nodes in the third level (e.g., two levels below the root node 302) for each of the clusters generated at the second level of the recursive structure 300. For example, the recursive structure generation module 204 may create the nodes 310 and 312 in the third level of the recursive structure 300 connected to the node 304 based on the groups of documents 336 and 338. Similarly, the recursive structure generation module 204 may create the nodes 314 and 316 in the third level of the recursive structure 300 connected to the node 306 based on the groups of documents 340 and 342. The recursive structure generation module 204 may also create the nodes 318 and 320 in the third level of the recursive structure 300 connected to the node 308 based on the groups of documents 344 and 346.

The classification module 132 may continue to create clustering models for the newly created nodes, to divide the corresponding groups of documents, and to create new nodes at a subsequent level of the recursive structure 300, until the classification module 132 determines that a particular group of documents associated with a particular node cannot be further divided by a clustering model. When the model training module 208 determines that the particular group of documents associated with the particular node cannot be further divided, the particular node becomes a leaf node of the recursive structure 300, and no additional node will be added below that particular node. For example, the model generation module 206 may generate a clustering model for each of the newly created nodes 310-320. The model training module 208 may determine a number of clusters for each of the clustering modules and attempt to use the clustering models to divide the corresponding groups of documents. In this example, the model training module 208 may determine the number of clusters for the group of documents 336 to be one (that is, the group of documents 336 cannot be divided into two or more clusters by the clustering model based on their features). Once the model training module 208 determines that the group of documents 336 cannot be further divided by the corresponding clustering model, the recursive structure generation module 204 may stop adding new nodes below the corresponding node 310 and may designate the node 310 as a leaf node.

Similarly, the model training module 208 may also determine that the groups of documents 338, 344, and 346 corresponding to the nodes 312, 318, and 320 cannot be further divided by the clustering models associated with the nodes 312, 318, and 320. Thus, the recursive structure generation module 204 may also stop adding new nodes below the nodes 312, 318, and 320, and may designate the nodes 312, 318, and 320 as leaf nodes.

For the groups of documents (e.g., the groups of documents 340 and 342) that can be further divided by the corresponding clustering models, the recursive structure generation module 204 may continue to add new nodes below the corresponding nodes 314 and 316 based on the number of clusters determined for the clustering models. In this example, the model training module 208 may determine to divide each of groups of documents 340 and 342 into two clusters (two groups of documents). Thus, the recursive structure generation module 204 may add two new nodes 322 and 324 below the node 314 and add two new nodes 352 and 354 below the node 316. By using the clustering model associated with the node 314, the model training module 208 may divide the group of documents 340 into two groups of documents 348 and 350 based on the features of the documents. Similarly, by using the clustering model associated with the node 316, the model training module 208 may divide the group of documents 342 into two groups of documents 352 and 354 based on the features of the documents. The model training module 208 may determine that the groups of documents 348-354 cannot be further divided. Thus, the recursive structure generation module 204 may determine to stop adding new nodes below the nodes 322-328 and may designate the nodes 322-328 as leaf nodes.

In some embodiments, the model generation module 206 may generate a machine learning model for each of the leaf nodes in the recursive structure 300. Thus, in this example, the model generation module 206 may generate a machine learning model for each of the leaf nodes 310, 312, 318, 320, 322, 324, 326, and 328. Each of the machine learning models may be configured to perform data classifications (e.g., document classifications) for the corresponding groups of documents. Since different groups of documents associated with the leaf nodes include different documents, which have different features and may correspond to different subsets of document types, the machine learning models associated with the leaf nodes may be configured differently. For example, different machine learning models may be configured to classify documents into different subsets of document types.

In some embodiments, the model training module 208 may configure each of the machine learning models based on the corresponding group of documents. For example, the model training module 208 may configure the machine learning model associated with the leaf node 310 based on the group of documents 336. The model training module 208 may first determine a subset of document types corresponding to the documents within the group of documents 336. Since the group of documents 336 includes only a portion of the initial set of documents 220 and is a result of one or more clustering using one or more clustering models, the subset of document types should include only a portion of the document types corresponding to the initial set of documents 220. Thus, the subset of document types corresponding to the documents within the group of documents 336 may include only a small number of document types (e.g., below the threshold such as less than 20, less than 10, etc.). As such, the model training module 208 may configure the machine learning model associated with the leaf node 310 to perform simple data classifications (e.g., classifying documents into a small number of document types below a threshold). In some embodiments, the model training module 208 may also train the machine learning model associated with the leaf node 310. For example, the model training module 208 may use the group of documents 336 to train the machine learning model. In another example, instead of using the group of documents 336 corresponding to the leaf node 310 to train the machine learning model, the model training module 208 may use the group of documents associated with a node connected to the node 310 in one or more precedent levels in the recursive structure 300 for training the machine learning model. In such examples, the model training module 208 may use the group of documents 330 associated with the node 304 (the parent of the node 310) or the group of documents 220 associated with the root node 302 (the grandparent of the node 310) to train the machine learning model. The model training module 208 may use the same techniques to configure and train the other machine learning models associated with the leaf nodes 312 and 318-328. Since the groups of documents associated with the different leaf nodes may correspond to different subsets of document types, each of the machine learning models may be configured differently (e.g., to classify documents based on different subsets of document types).

After each of the machine learning models associated with the leaf nodes is configured and trained, the classification module 132 may begin classifying documents. For example, the user interface server 134 receives a document via a user interface (e.g., a webpage associated with the online service provider 130, a mobile application associated with the online service provider 130, etc.). The document may be received in response to a request to provide a document corresponding to a particular document type required for the service application 138 to process a transaction. Upon receiving the document, the user interface server 134 and/or the service application 138 may request the classification module 132 to classify the document into one of a set of document types. As discussed herein, the document may be any one document type among a large number of document types (e.g., 200, 500, 1000, etc.).

Based on the request, the classification module 132 may use the machine learning model framework disclosed herein to classify the document. In some embodiments, the document received via the user interface server 134 is in the form of an image (e.g., a JPEG file, a PDF file, etc.). The classification manager 202 may extract features, such as the text features, the image features, and the enriched features, etc., from the image, using the techniques disclosed herein.

The classification manager 202 may then use the prediction module 210 to classify the document using the recursive structure 300. The prediction module 210 may traverse the recursive structure 300, starting at the root node 302, based on the document. At each non-leaf node in the recursive structure (e.g., the root node 302), the prediction module 210 may use the clustering model associated with the node to assign the document, based on the features of the document, to one of the multiple clusters that were generated by the clustering model. Based on the assigned cluster, the prediction module 210 may select one of the multiple paths within the recursive structure 300 to reach another node in the subsequent level of the recursive structure 300. For example, at the root node 302, the prediction module 210 may use the clustering model associated with the root node 302 to assign the document to one of the three clusters generated by the clustering model. In some embodiments, the prediction module 210 may determine a vector or a point within the multi-dimensional space based on the features of the document. As discussed herein, each of the three clusters may have a centroid representing a center of the cluster. The prediction model may assign the document to a cluster having a centroid closest to the vector or point determined for the document.

Based on the cluster assigned to the document, the prediction module 210 may select a path (e.g., a next node in the subsequent level) in the recursive structure 300. For example, if the document is assigned to the second cluster of the three clusters, the prediction module 210 may travel from the root node 302 to the node 306 in the second level of the recursive structure 300. Since the node 306 is not a leaf node, the prediction module 210 may again use the clustering model associated with the node 306 to assign the document to one of the clusters and continue to traverse the recursive structure 300 based on the assigned cluster, until a leaf node is reached.

In this example, the prediction module 210 may reach the leaf node 324 based on the clusters assigned to the document along a path in the recursive structure 300. Once the prediction module 210 has reached the leaf node 324, the prediction module 210 may use the machine learning model associated with the leaf node 324 to classify the document. Since the document, based on the clusters assigned to the document along the nodes 302, 306, and 314 in the recursive structure 300, has features that are similar to the group of documents 350 associated with the leaf node 324, the document likely corresponds to one of the subset of document types corresponding to the group of documents 350. Thus, the machine learning model may classify the document to a particular document type from the subset of document types.

The classification manager 202 may perform one or more actions based on the determined document type of the document. For example, the classification manager 202 may transmit the particular document type to the service application 138. In some embodiments, the classification module 132 and/or the service application 138 may determine whether the particular document type corresponds to a requested document type. If the particular document type does not correspond to the requested document type, the classification module 132 and/or the service application 138 may cause the user interface server 134 to present an error message on the user interface and to prompt the user to resubmit a document that corresponds to the requested document type.

If the document type corresponds to the requested document type, the classification module 132 and/or the service application 138 may accept the document and store the document in a data storage (e.g., the account database 136) in association with a user account of the user. In some embodiments, based on the particular document type, the classification module 132 and/or the service application 138 may extract data from the document according to a format associated with the particular document type. For example, if the document is determined to be a United States passport, the classification module 132 and/or the service application 138 may extract data (e.g., a name, an address, a passport number, a date of birth, an issuance place, etc.) from the document based on a format associated with the passport document type. The extracted data can be categorized and stored in the account database 136.

As discussed herein, the document received from the user may not correspond to any of the known categories (e.g., the set of document types corresponding to the initial set of documents 220). For example, a new document type may be created (e.g., a new type of agreement, a new identification card, etc.) after the machine learning model framework is created and trained. In some embodiments, the classification module 132 may be configured to detect a new category (e.g., a new document type) associated with a document. As the prediction module 210 assigns a document to one or more clusters, the prediction module 210 may determine a deviation score for the document. The deviation score may be determined based on a difference between the document and the group of documents associated with the assigned cluster. When the deviation score exceeds a threshold, the prediction module 210 may determine that the document deviates from the other documents within each of the assigned cluster sufficiently that the document may not be part of the assigned cluster. In some embodiments, the threshold may be dynamically adjusted based on a cost function that quantifies a cost of a false negative and a cost of false positive. Thus, the prediction module 210 may indicate that the document may correspond to an unknown category (document type) even though the prediction module 210 may still provide a particular document type based on the classification performed by the machine learning model.

The prediction module 120 may alert the user interface server 134 and/or the service application 138 that the document may correspond to an unknown document type. In some embodiments, when a number of documents that are determined to correspond to an unknown document type, the classification module 132 may re-configure and/or re-train the machine learning model framework. The re-configuring and/or re-training may involve generating a new recursive structure based on new training data that includes documents corresponding to the unknown document type (or a newly identified document type) that may be different from the existing recursive structure 300. New clustering models may be associated with the non-leaf nodes and machine learning models may be associated with leaf nodes using similar techniques described herein. In some embodiments, the classification module 132 may use the new machine learning model framework to classify documents after the new machine learning model framework is generated.

Even though the examples illustrated above involve classifying a document into different document types, the classification module 132 may use a machine learning model framework disclosed herein to perform other types of classifications, such as classifying images of animals/insects/plants into different species, classifying bacteria or viruses, classifying a disease, etc.

Figure 4:
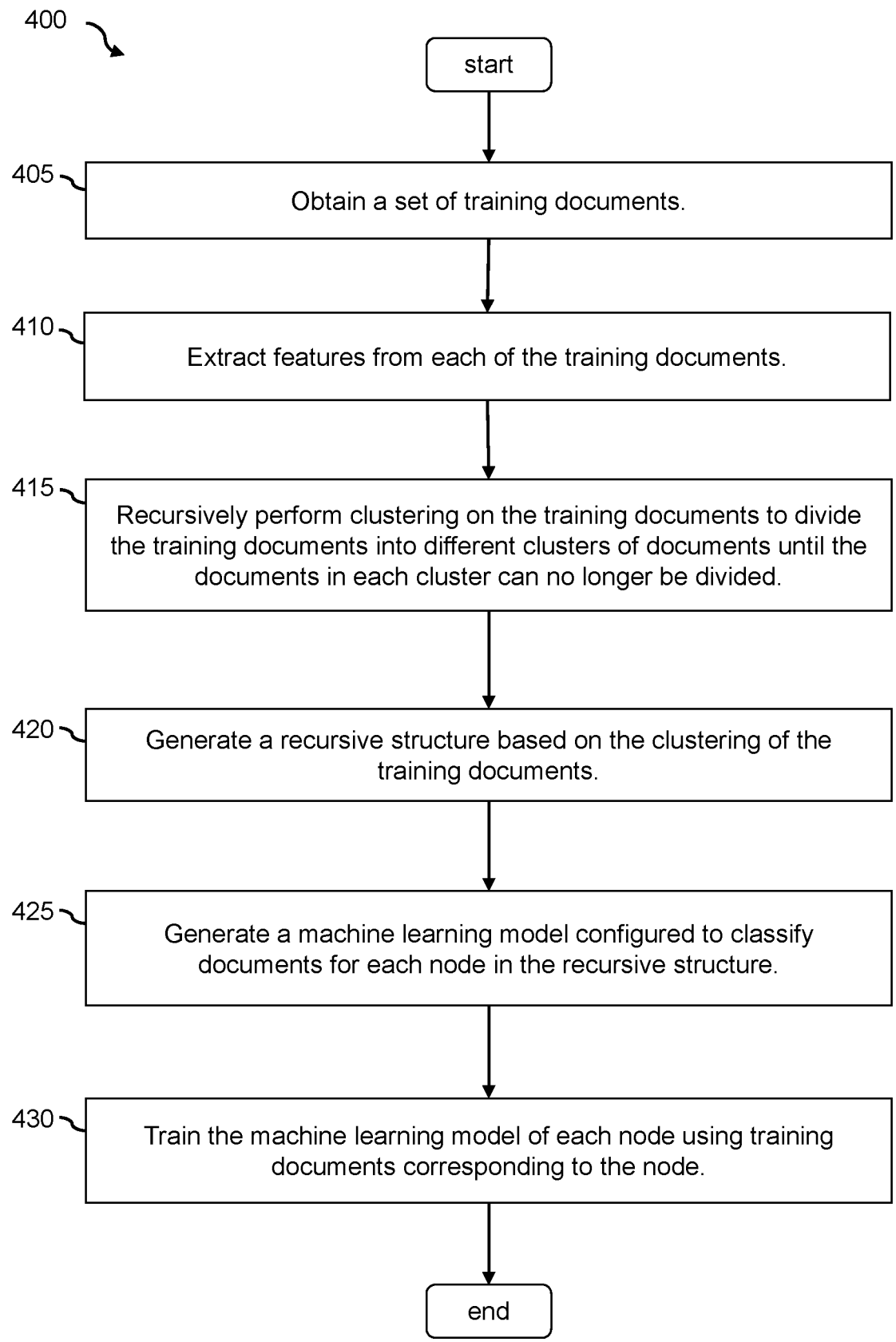
FIG. 4 is a flowchart showing a process of generating a machine learning model framework according to an embodiment of the present disclosure.

FIG. 4 illustrates a process 400 for generating a machine learning model framework according to various embodiments of the disclosure. In some embodiments, at least a portion of the process 400 may be performed by the classification module 132. The process 400 begins by obtaining (at step 405) a set of training documents. For example, the classification manager may access the set of documents 220 from the data storage 270. The set of documents 220 may include images of documents that have been previously classified (e.g., labeled).

The process 400 then extracts (at step 410) features from each of the training documents. For example, the classification manager 202 may extract features, such as text features, image features, and enriched features from each image of a document using the techniques disclosed herein.

The process 400 then recursively performs (at step 415) clustering on the training documents to divide the training documents into different clusters of documents until the documents in each cluster can no longer be divided and generates (at step 420) a recursive structure based on the clustering of the training documents. For example, the model generation modules may generate clustering models configured to divide the set of documents 220 into different clusters (different groups of documents). In some embodiments, the recursive structure generation module 204 may generate a recursive structure (e.g., the recursive structure 300) by first creating a root node (e.g., the root node 302). The recursive structure generation module 204 may associate a clustering module with the root node 302. The clustering model may divide the set of documents 220 into three groups of documents. As a result, the recursive structure generation module 204 may create three additional nodes (e.g., the nodes 304-308) in the second level of the recursive structure 300. The classification module 132 may continue to divide the different groups of documents using different clustering models and creating new nodes in the recursive structure 300 based on the new clusters until none of the groups of documents can be further divided.

The process 400 then generates (at step 425) a machine learning model configured to classify documents for each node in the recursive structure, and train (at step 430) the machine learning model of each node using training documents corresponding to the node. In some embodiments, the model generation module 206 may generate a machine learning model for each of the leaf nodes 310, 312, and 318-328 in the recursive structure 300 as discussed herein. However, in some embodiments, the model generation module 206 may generate a machine learning model for other non-leaf nodes as well, such as for one or more of the non-leaf nodes 302-320. The model training module 208 may then train each of the machine learning model using the group of documents associated with the corresponding node.

Figure 5:
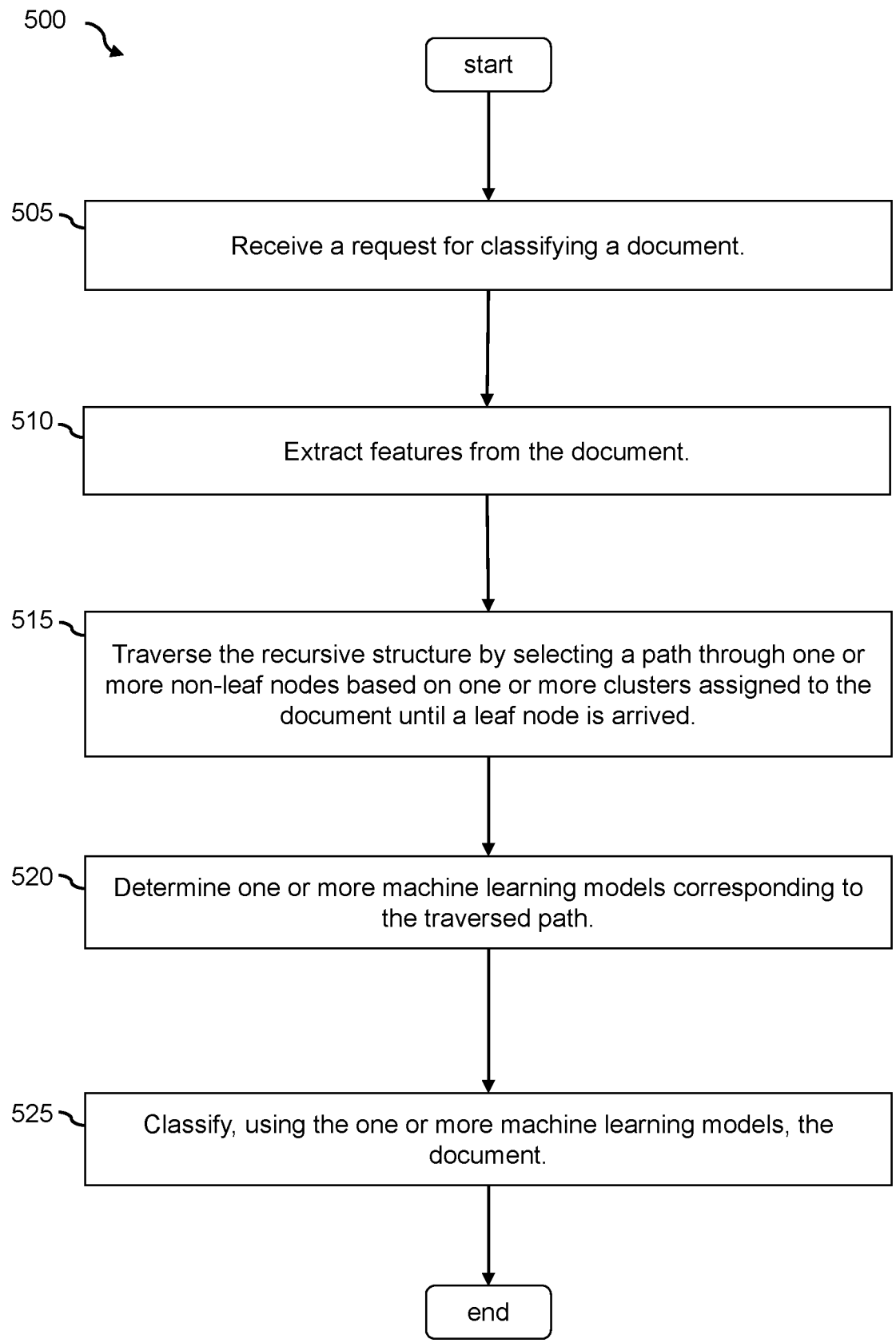
FIG. 5 is a flowchart showing a process of classifying data by using a machine learning model framework according to an embodiment of the present disclosure.

FIG. 5 illustrates a process 500 for using a machine learning model framework to classify documents according to various embodiments of the disclosure. In some embodiments, at least a portion of the process 500 may be performed by the classification module 132. The process 500 begins by receiving (at step 505) a request for classifying a document. For example, the user interface server 134 may receive a document from a user, via a user interface presented on a device (e.g., the user device 110, the merchant server 120, etc.). The document may be received in response to a prompt to the user for providing a document of a specific document type.

The process 500 then extracts (at step 510) features from the document. For example, upon receiving the document, the classification manager 202 may extract features from the document. As discussed herein, since the document may be received in an image format (e.g., a JPEG file, a PDF file, etc.), the classification manager 202 may extract features, such as text features, image features, enriched features, using techniques disclosed herein.

The process 500 traverses (at step 515) the recursive structure by selecting a path through one or more non-leaf nodes based on one or more clusters assigned to the document until a leaf node is arrived. For example, the prediction module 210 may begin at the root node 302 of the recursive structure 300. The prediction module 210 may use the clustering model associated with the root node 302 to assign one of the three clusters to the document. Based on the cluster assigned to the document, the prediction module 210 may select a next node in the second level. The prediction module 210 may recursively assign clusters to the document at the non-leaf nodes along a path within the recursive structure 300 until the prediction module 210 arrives at a leaf node.

The process 500 then determines (at step 520) one or more machine learning models corresponding to the traversed path and classify (at step 525), using the one or more machine learning models to classify the document. In some embodiments where machine learning models are generated only for the leaf nodes, the prediction module 210 may determine a leaf node at which the prediction module 210 arrives based on traversing the recursive structure using the document. The prediction module 210 may then use the machine learning model associated with the leaf node to classify the document as a particular document type. On the other hand, when machine learning models are generated for non-leaf nodes in addition to the leaf nodes, the prediction module 210 may determine one or more machine learning models generated for the nodes along the traversed path in the recursive structure. In some embodiments, the prediction module 210 may select one of the one or more machine learning models for classifying the document. In some embodiments, the prediction module 210 may generate an ensemble model based on the one or more machine learning models and may use the ensemble model to classify the document as a particular document type. The classification manager 202 may then output the particular document type to the user interface server 134 and/or the service application 138.

Figure 6:
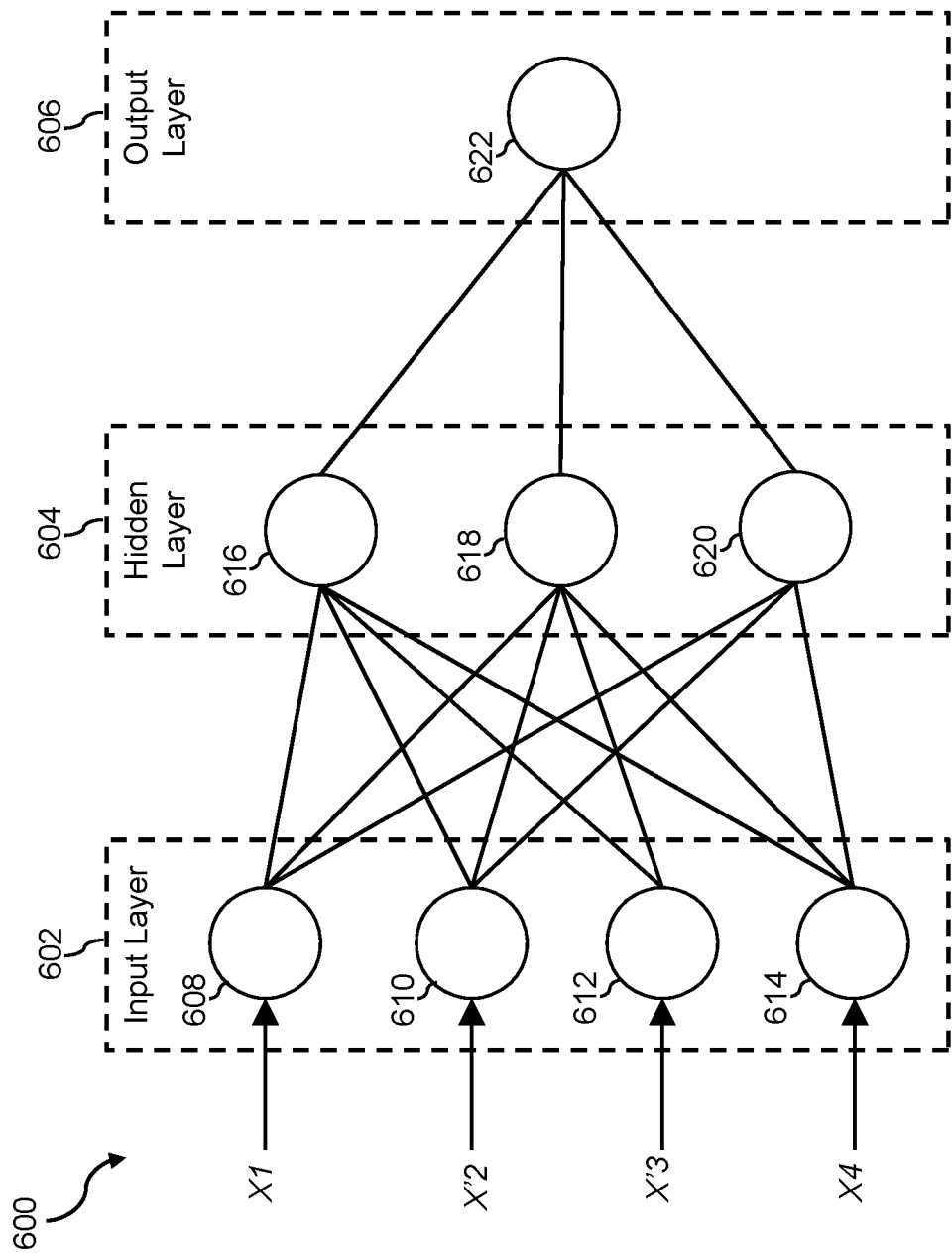
FIG. 6 illustrates an example neural network that can be used to implement a machine learning model according to an embodiment of the present disclosure.

FIG. 6 illustrates an example artificial neural network 600 that may be used to implement any machine learning models (e.g., models 252, 254, 256, etc.) that are associated with a recursive structure. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-620, and the output layer 606 includes a node 622. In this example, each node in a layer is connected to every node in an adjacent layer. For example, the node 608 in the input layer 602 is connected to all of the nodes 616-620 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement any one of the computer-based models 252, 254, 256, etc., may include as many hidden layers as necessary.

In this example, the artificial neural network 600 receives a set of inputs and produces an output. Each node in the input layer 602 may correspond to a distinct input. For example, when the artificial neural network 600 is used to implement a machine learning model configured to classify documents, each node in the input layer 602 may correspond to a distinct feature of a document (e.g., a text feature, an image feature, an enriched feature, etc.).

In some embodiments, each of the nodes 616-620 in the hidden layer 604 generates a representation, which may include a mathematical computation (or algorithm) that produces a value based on the input values received from the nodes 608-614. The mathematical computation may include assigning different weights (e.g., node weights, etc.) to each of the data values received from the nodes 608-614. The nodes 616-620 may include different algorithms and/or different weights assigned to the data variables from the nodes 608-614 such that each of the nodes 616-620 may produce a different value based on the same input values received from the nodes 608-614. In some embodiments, the weights that are initially assigned to the features (or input values) for each of the nodes 616-620 may be randomly generated (e.g., using a computer randomizer). The values generated by the nodes 616-620 may be used by the node 622 in the output layer 606 to produce an output value for the artificial neural network 600. When the artificial neural network 600 is used to implement a machine learning model configured to classify documents, the output value produced by the artificial neural network 600 may indicate a document type from a set of document types.

The artificial neural network 600 may be trained by using training data. By providing training data to the artificial neural network 600, the nodes 616-620 in the hidden layer 604 may be trained (adjusted) such that an optimal output (e.g., an entity) is produced in the output layer 606 based on the training data. By continuously providing different sets of training data, and penalizing the artificial neural network 600 when the output of the artificial neural network 600 is incorrect (e.g., when the determined document type is inconsistent with the labeled document type of the document, etc.), the artificial neural network 600 (and specifically, the representations of the nodes in the hidden layer 604) may be trained (adjusted) to improve its performance in name entity recognition. Adjusting the artificial neural network 600 may include adjusting the weights associated with each node in the hidden layer 604.

Figure 7:
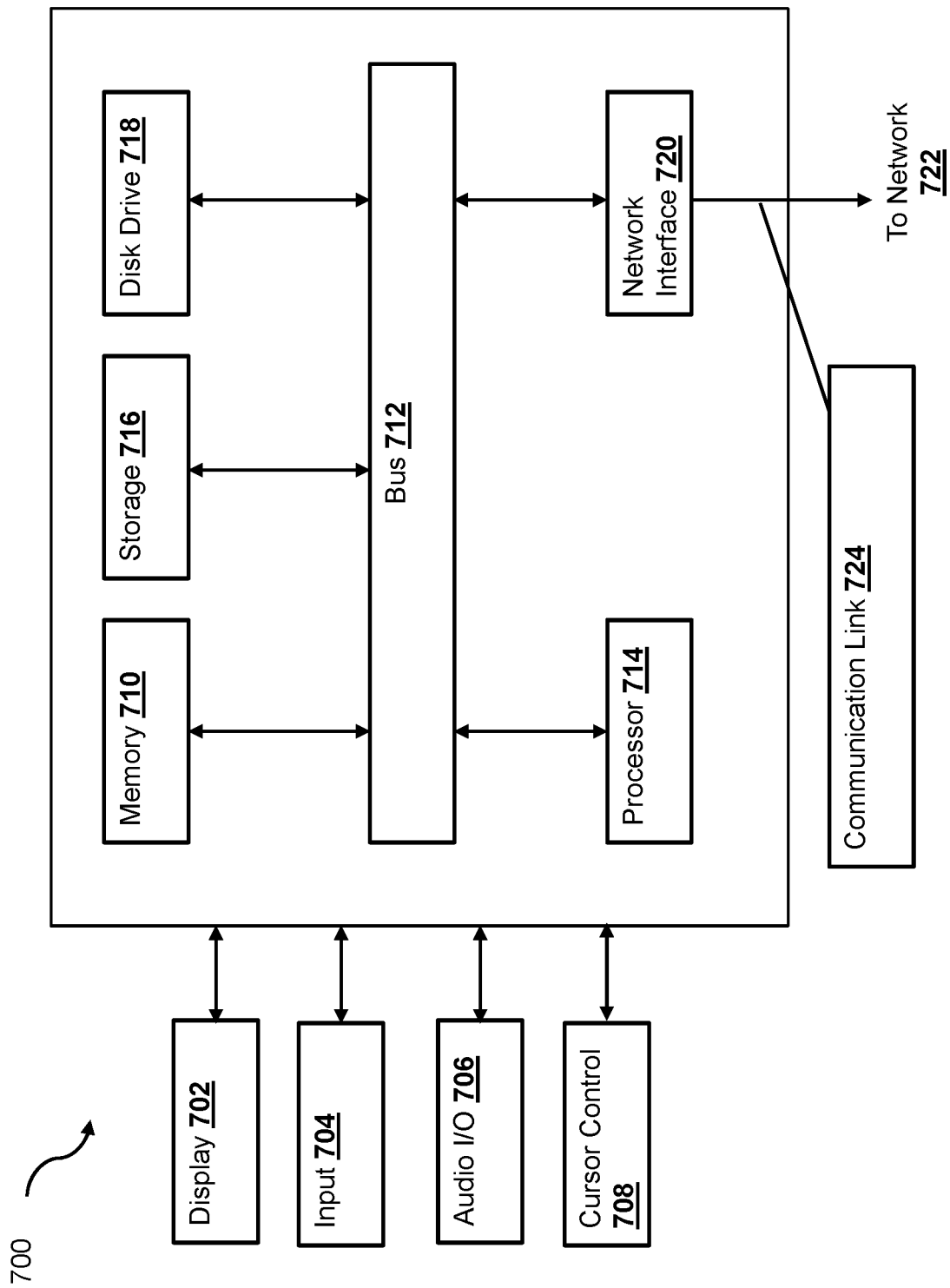
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 804 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the machine learning model framework generation functionalities and the data classification functionalities described herein, for example, according to the processes 400 and 500.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
receiving a request for classifying a document as one of a plurality of document types;
extracting, from the document, a plurality of features;
recursively performing a plurality of cluster assignment processes on the document according to a recursive structure based on the plurality of features, wherein the recursive structure corresponds to a plurality of a clusters that does not correlate to the plurality of document types, wherein the document is assigned to a different cluster in the plurality of clusters during each cluster assignment process in the plurality of cluster assignment processes, and wherein a cluster assignment process in the plurality of cluster assignment processes is selected to be performed on the document based on a cluster to which the document is assigned during a previous cluster assignment process and according to the recursive structure;
determining, from the plurality of clusters, a particular cluster to which the document is assigned during a last cluster assignment process in the plurality of cluster assignment processes;
selecting, from a plurality of machine learning models configured to perform document classifications, a first machine learning model based on the particular cluster to which the document is assigned during the last cluster assignment process, wherein the first machine learning model is configured to classify documents based on a first subset of document types from the plurality of document types, and wherein the plurality of machine learning models comprises a second machine learning model configured to classify the documents based on a second subset of document types that partially overlaps with the first subset of document types; and classifying, using the first machine learning model, the document as a particular document type from the first subset of document types.

2. The system of claim 1, wherein the recursively performing the plurality of cluster assignment processes comprises:

determining a first cluster assigned to the document based on a first cluster assignment process from the plurality of cluster assignment processes, wherein the first cluster assignment process corresponds to a first node in the recursive structure;

selecting, from a plurality of child nodes of the first node, a first child node that corresponds to the first cluster; and performing, on the document, a second cluster assignment process corresponding to the first child node.

3. The system of claim 1, wherein the recursively performing the plurality of cluster assignment processes comprises:

performing a first cluster assignment process on the document, wherein the performing the first cluster assignment process comprises assigning the document to a first cluster from a first plurality of clusters associated with the first cluster assignment process;

selecting, from a first set of cluster assignment processes corresponding to the first cluster, a second cluster assignment process; and performing the second cluster assignment process on the document, wherein the performing the second cluster assignment process comprises assigning the document to a second cluster from a second plurality of clusters associated with the second cluster assignment process.

4. The system of claim 3, wherein the operations further comprise:

selecting, from a second set of cluster assignment processes corresponding to the second cluster, a third cluster assignment process; and performing the third cluster assignment process on the document, wherein the performing the third cluster assignment process comprises assigning the document to a third cluster from a third plurality of clusters associated with the third cluster assignment process.

5. The system of claim 1, wherein each cluster assignment process in the plurality of cluster assignment processes is associated with a different plurality of clusters.

6. The system of claim 1, wherein the request comprises an image of the document, and wherein the extracted features comprise features of the image.

7. The system of claim 1, wherein the operations further comprise:

recursively determining different sets of cluster assignment processes for each node in the recursive structure based on a plurality of training documents.

8. A method, comprising:
receiving a request for classifying an image as one of a plurality of categories;

extracting a plurality of features from the image;

recursively assigning the image to one or more clusters using a plurality of clustering models based on the plurality of features during a plurality of assignment iterations according to a hierarchical structure, wherein the one or more clusters were generated independent of the plurality of categories, wherein a different clustering model in the plurality of clustering models is used to assign the image to a different cluster in the one or more clusters during each assignment iteration in the plurality of assignment iterations based at least in part on a previously assigned cluster for the image according to the hierarchical structure;

determining, from a plurality of clusters, a particular cluster to which the image is assigned during a particular assignment iteration in the plurality of assignment iterations;

selecting, from a plurality of machine learning models configured to perform image classifications, a first machine learning model based on the particular cluster to which the image is assigned during the particular assignment iteration, wherein the first machine learning model is configured to classify images based on a first subset of categories from the plurality of categories, and wherein the plurality of machine learning models comprises a second machine learning model configured to classify the images based on a second subset of categories that partially overlaps with the first subset of categories; and classifying, using the first machine learning model, the image as a particular category from the first subset of categories.

9. The method of claim 8, wherein the plurality of machine learning models is configured to classify images based on different subsets of categories from the plurality of categories.

10. The method of claim 8, further comprising:
assigning a second image to a first cluster during a first assignment iteration, wherein the first cluster comprises a plurality of images; and determining that the second image corresponds to an additional category not included within the plurality of categories based on a comparison between the second image and the plurality of images.

11. The method of claim 10, further comprising:
modifying a first machine learning model from the plurality of machine learning models to include the additional category.

12. The method of claim 10, further comprising:
classifying the second image as the additional category.

13. The method of claim 8, further comprising:
extracting, from the image, data corresponding to a plurality of data types based on the particular category; and storing the extracted data in an electronic data storage according to the plurality of data types.

14. The method of claim 8, wherein the image is received via a user interface displayed on a user device, and wherein the method further comprises:

determining whether the particular category matches a requested category on the user interface; and providing an error message on the user interface in response to determining that the particular category does not match the requested category.

15. A non-transitory machine-readable medium having stored thereon machine-readable instructions executable to cause a machine to perform operations comprising:

receiving a request for classifying a document as one of a plurality of categories;

extracting, from the document, a plurality of features;

iteratively assigning the document to one or more clusters using a plurality of cluster assignment processes corresponding to a recursive structure during a plurality of assignment iterations, wherein the one or more clusters lack correlations to the plurality of categories, wherein the document is assigned to a different cluster in the one or more clusters associated with the recursive structure at each assignment iteration in the plurality of assignment iterations, and wherein a cluster assignment process in the plurality of cluster assignment processes is selected to be performed on the document based on a cluster to which the document is assigned during a previous assignment iteration in the plurality of assignment iterations and according to the recursive structure;

determining, from a plurality of clusters, a particular cluster to which the document is assigned during a final assignment iteration in the plurality of assignment iterations;

selecting, from a plurality of machine learning models configured to perform document classifications, a first machine learning model based on the particular cluster to which the document is assigned during the final assignment iteration, wherein the first machine learning model is configured to classify documents based on a subset of categories from the plurality of categories, and wherein the plurality of machine learning models comprises a second machine learning model configured to classify the documents based on a second subset of categories that partially overlaps with the first subset of categories; and classifying, using the first machine learning model, the document as a particular category from the first subset of categories.

16. The non-transitory machine-readable medium of claim 15, wherein the iteratively assigning the document to the one or more clusters comprises:

assigning, using a first clustering model associated with a first node of the recursive structure, the document to a first cluster from a first plurality of clusters;

selecting, from a first set of clustering models corresponding to the first cluster, a second clustering model; and assigning, using the second clustering model associated with a second node of the recursive structure, the document to a second cluster from a second plurality of clusters.

17. The non-transitory machine-readable medium of claim 16, wherein the operations further comprise:

selecting, from a second set of clustering models corresponding to the second cluster, a third clustering model; and assigning, using the third clustering model associated with a third node of the recursive structure, the document to a third cluster from a third plurality of clusters.

18. The non-transitory machine-readable medium of claim 15, wherein the operations further comprise:

assigning a second document to a first cluster comprising a first set of documents; and determining that the second document corresponds to an additional category not included within the plurality of categories based on a comparison between the second document and the first set of documents.

19. The non-transitory machine-readable medium of claim 15, wherein the operations further comprise:

extracting, from the document, data corresponding to a plurality of data types based on the particular category; and storing the extracted data in an electronic data storage according to the plurality of data types.

20. The non-transitory machine-readable medium of claim 15, wherein the document is received via a user interface displayed on a user device, and wherein the operations further comprise:

determining whether the particular category matches a requested category on the user interface; and providing an error message on the user interface in response to determining that the particular category does not match the requested category.

* * * * *